Figure 1:
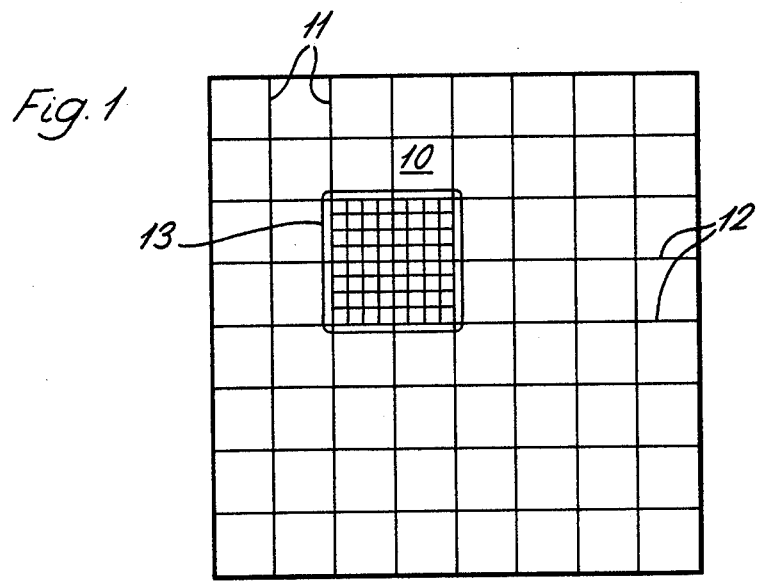

United States Patent [19]

Hawkes

[11] 4,110,556
[45] Aug. 29, 1978

[54] GRAPHICAL INPUT DEVICES

[75] Inventor: Peter Louis Hawkes, Harlow, England

[73] Assignee: National Research Development Corporation, London, England

[21] Appl. No.: 781,967

[22] Filed: Mar. 28, 1977

[30] Foreign Application Priority Data

Apr. 2, 1976 [GB] United Kingdom ............... 13521/76

[51] Int. Cl.² ............................................. G08C 21/00
[52] U.S. Cl. ........................................ 178/19; 178/18
[58] Field of Search .................................... 178/18, 19; 340/146.3 SY, 146.3 MA, 146.3 H, 365 C; 33/1 M

[56] References Cited

U.S. PATENT DOCUMENTS

| 3,665,102 | 5/1972 | Townsend et al. ................... 178/18 |
| 3,832,693 | 8/1974 | Ishizaki et al. ..................... 178/19 |
| 4,022,969 | 5/1977 | McKinlay et al. .................... 178/18 |
| 4,029,899 | 6/1977 | Gordon ............................ 178/19 |

Primary Examiner—Thomas A. Robinson
Attorney, Agent, or Firm—Cushman, Darby & Cushman

[57] ABSTRACT

A graphical input device is described which has a large surface divided into main regions and a small cursor divided into sub-regions. In one embodiment both the large surface and the cursor contain conductors to sense the position of a stylus used for indicating points in the large surface but the conductors of the large surface are widely spaced compared with those of the cursor. In operation the cursor is placed over a point whose position is required in the form of electrical signals and the stylus is used to indicate the point. In another embodiment only the cursor contains conductors, the large surface being divided by lines, and the position of the cursor being recorded by an operator.

22 Claims, 5 Drawing Figures

GRAPHICAL INPUT DEVICES

The present invention relates to apparatus and methods for providing a signal representative of the position of a point indicated by stylus means, particularly but not exclusively where the point may be anywhere on a relatively large surface. The invention is expected to prove useful in the fields of graphical inputs for computers and digitisers for indicating the position of points in two dimensional surfaces such as on graphs or maps or other diagrams.

According to a first aspect of the present invention there is provided apparatus for generating signals representative of the position of a point on a surface indicated by stylus means, including a member having a working surface suitable for use with stylus means to allow the stylus means to be used to indicate points in the working surface, first sensing means for sensing the position of an indicating portion of the stylus means in relation to the working surface to sense the position of points therein indicated by the stylus means, cursor means which may be placed on, and moved over, the working surface without materially affecting the operation of the first sensing means even when between the stylus means and the working surface, the cursor means having a working area which is small in relation to the working surface, second sensing means for sensing the position of the indicating portion of the stylus means in relation to the working area of the cursor means to sense the position of points therein indicated by the stylus means, the resolution of the second sensing means being high relative to that of the first sensing means, and means for indicating the position of the cursor means on the working surface.

Preferably the working surface is divided into main regions and the working area of the cursor means is divided into sub-regions.

According to a second aspect of the present invention there is provided apparatus for generating signals representative of the position of a point indicated by stylus means, including a member having a working surface, cursor means which may be placed on and moved over the working surface, the cursor means having a working area which is small in relation to the working surface, sensing means for sensing the position of the indicating portion of stylus means in relation to the working area to sense the position of points therein indicated by the stylus means, and means for indicating the position of the cursor means on the working surface.

The means for indicating the position of the cursor means may include first and second groups of equally spaced parallel lines, the lines of the first group being at right angles to those of the second group, and the lines of the groups dividing the working surface into main regions, and the working area of the cursor means may be rectangular and of a size such that when on the working surface, it can be positioned to be coincident with one main region, or an integral number of the main regions.

In the second aspect of the invention the working area of the cursor means is preferably divided into sub-regions.

Preferably the main regions all have the same dimensions and the sub-regions of the cursor cover an integral number of the main regions.

The term stylus means in the specification and claims means not only a writing implement but also any means which can be used to indicate the positions of points or lines.

If the stylus means is constructed to interact with magnetic flux then the or each of the sensing means may include a plurality of sensing coils. The division of the working area of the cursor means into sub-regions may be by means of the sensing coils which may overlap in the direction of a required co-ordinate in the working area, and be positioned to divide the working area into the sub-regions with each sub-region within an arrangement of the sensing coils particular to that sub-region. The division of the working surface into main regions may be accomplished in the same manner by sensing coils of the first sensing means.

Usually rectangular co-ordinates will be required to indicate the position of the stylus means and then two sets of sensing coils are needed for the, or each, sensing means, one set for each co-ordinate.

The, or each, sensing means may include means responsive to change in flux linking the sensing coils and the stylus means for providing the signals representative of the position of the stylus means.

Various ways in which the sensing coils can be arranged and the means responsive to change in flux may be constructed are described in the cognate complete specifications for United Kingdom Patent Application Nos. 50200/74 and 23141/75 (Inventor: J. A. Gordon) filed on the Nov. 20, 1974 and the May 27, 1975, respectively; and in the specification of U.S. Pat. No. 4,029,899 issued June 14, 1977 (Inventor: J. A. Gordon).

In the second aspect of the invention, the apparatus may include manually-operable means, such as a keyboard, for providing signals representative of the position of the cursor means on the working surface, in response to operations carried out by an operator to indicate the cursor position.

In use with some forms of the invention, for example in translating a map into a series of digital co-ordinates for storage in a computer, the map is placed over the area of interest and the cursor is plced on the map in the region where co-ordinates are required. Clearly for this application the cursor must be transparent but when it is placed below the map it can, of course, be opaque. The cursor means must be placed on the area of interest in such a way that the sub-regions exactly sub-divide the main regions and the position of the cursor means is signalled either by using the manually-operable means, or later when current pulses are passed through a coil of the stylus means. by the further sensing means. The stylus means is now used for example to follow a line on the map, and a number of least significant "bits" for each co-ordinate are derived from signals induced in the sensing coils of the cursor means when current pulses in the coil of the stylus means induce currents in the sensing coils. At the same time currents are induced in the sensing coils of the working surface, if provided, and these currents give rise to the most significant "bits" in each co-ordinate the position of the stylus means. Since the sensing coils of the cursor means and the sensing coils of the working surface area arranged in a pattern which is unique for every subregion and main region, the currents derived in the sensing coils are indicative of the position of the stylus. When following a line of the map, the cursor means may have to be moved from time to time where the line extends beyond the cursor.

The main advantage of the present invention is that it allows the position of a point in a relatively large area to be signalled to high resolution without the whole area having to be divided, perhaps by means of many conductors, to that resolution. Indeed if the sensing coils of the working surface are not provided the large area need not be wired at all since then only the cursor means is wired.

Figure 2:
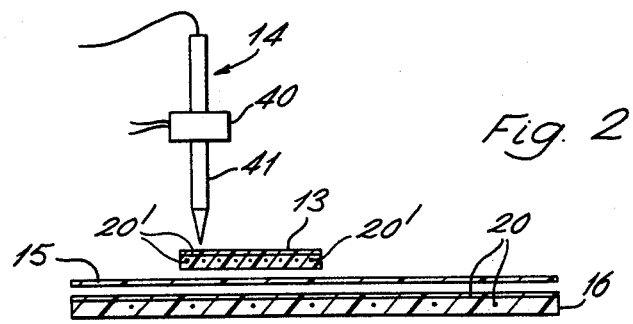
Figure 5:
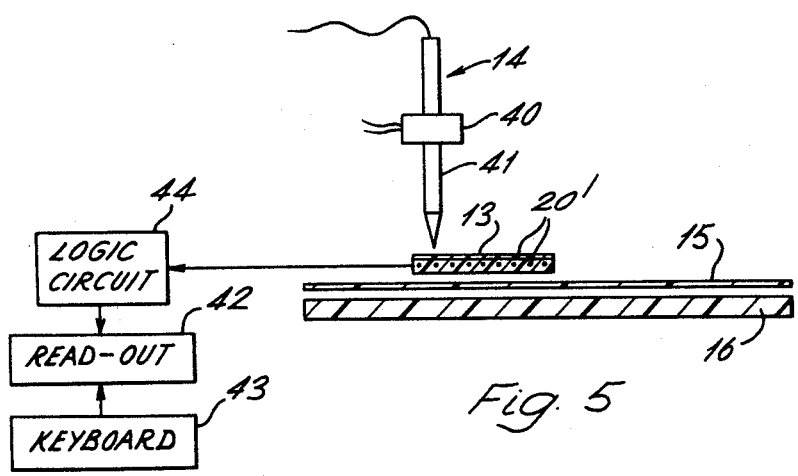
Figure 3:
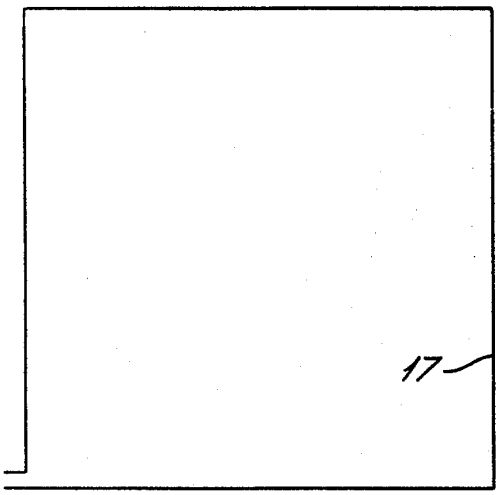
Figure 3:
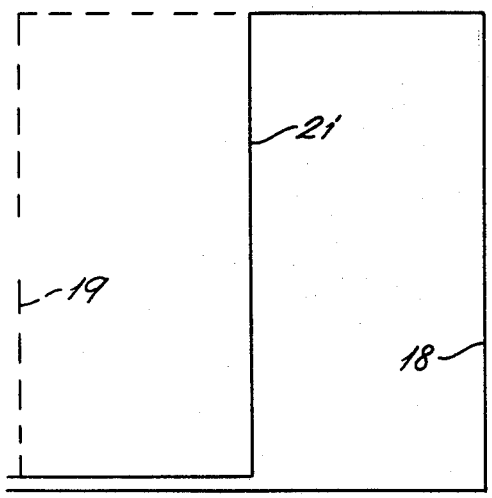
Figure 3:
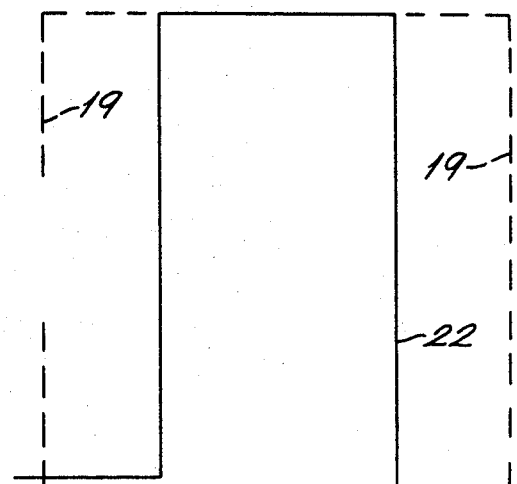
Figure 3:
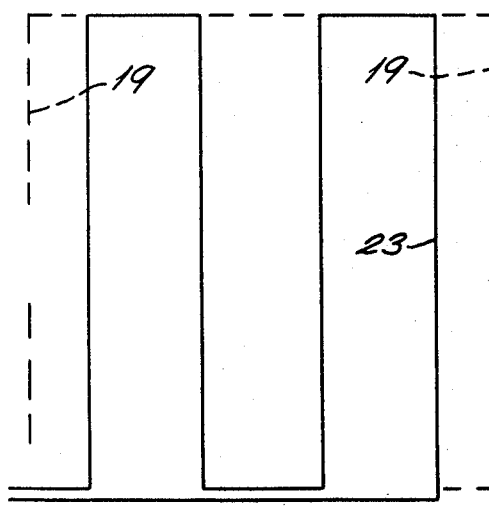
Figure 3:
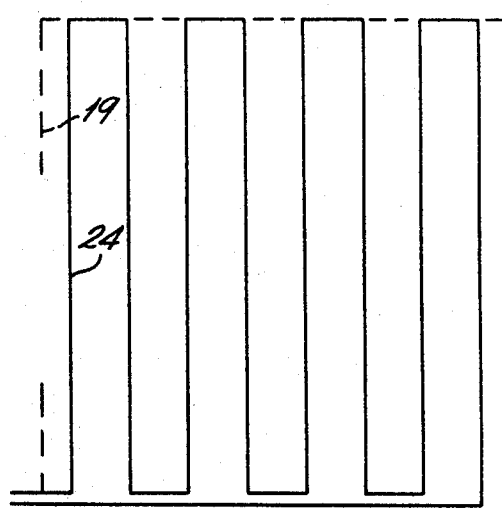
Figure 4:
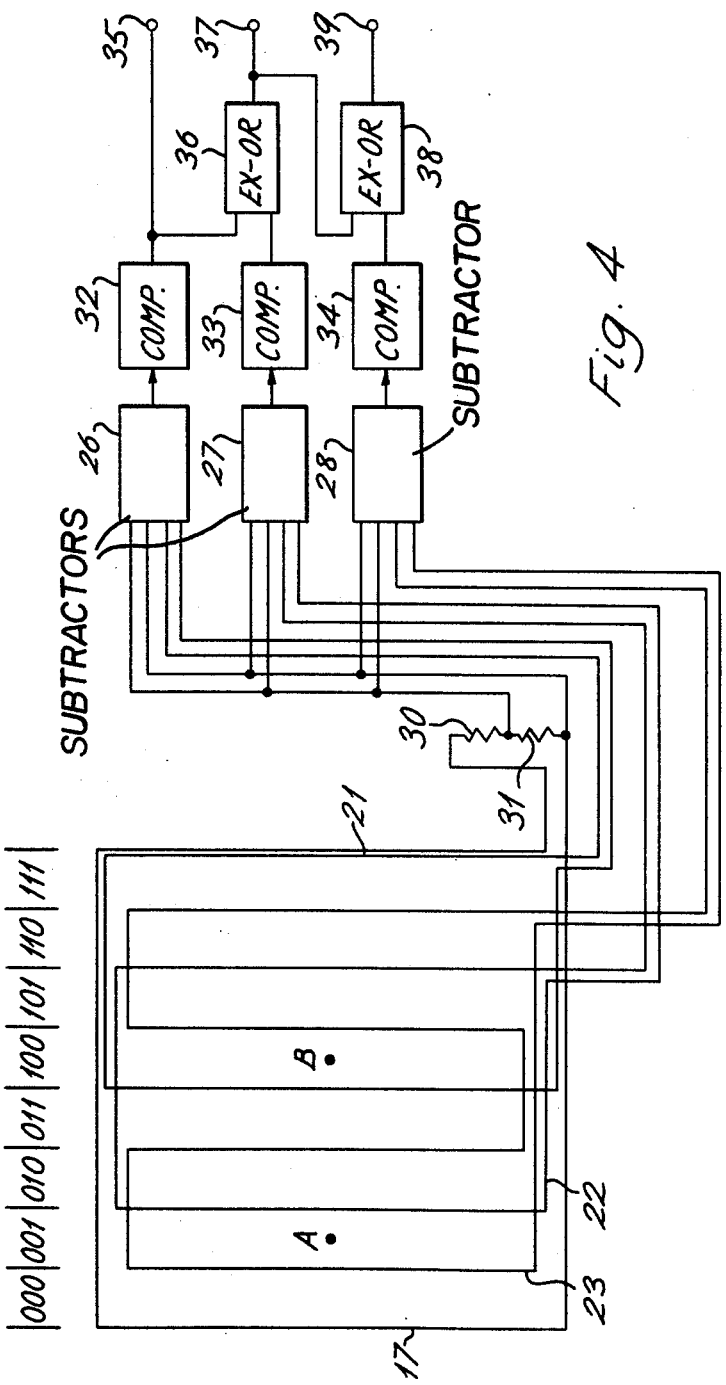

Certain embodiments of the invention will now be described, by way of example, with reference to the accompanying drawings, in which:

FIG. 1 shows a plan view of a surface and a cursor according to the invention,

FIG. 2 shows a schematic cross-section of the surface and cursor of FIG. 1 and an indicating stylus, FIG. 3 shows an arrangement of coils which may be used in the surface and cursor of FIGS. 1 and 2, FIG. 4 is a part-circuit part-block diagram of surface or cursor coils and circuits which may be used with the arrangements of FIGS. 1 and 2, and FIG. 5 shows a part schematic cross-section of a cursor and table surface and part-block diagram of another embodiment of the invention.

In the arrangement of FIGS. 1 and 2 a surface of a table 16 is divided into main regions, such as the region 10 by nine parallel lines, such as the lines 11 which appear vertical in FIG. 1 and nine parallel lines such as the lines 12 which appear horizontal in FIG. 1. A transparent cursor 13 is shown overlying four of the main regions and it will be seen that this cursor is divided into sub-regions. The boundaries of the main regions and the sub-regions are physically defined by conductors 20 and 20' (see FIG. 2) of sensing coils as described in the aforementioned cognate complete specification and the aforementioned U.S. patent. For example in FIG. 3, a first coil 17 follows the extreme edge of the working area designated 19 of the cursor surface and a second coil 18 is positioned over the coil 17. A side portion 21 of the coil 18 divides the area 19 into two halves. The next coil in the series, coil 22, when placed over the coil 18 has side portions which divide the operational area 18 together with the side portions of the coil 18 into four equal portions. Similarly a coil 23 having four side portions divides, together with the coils 18 and 22, the area of interest into eight equal portions. Coil 24 together with the other coils then divides the area into 16 equal portions. Coils 17 to 19 and 22 to 24 are all formed by the conductors 20' of the cursor.

The coils 17 to 24 may be placed over one another or, to prevent build-up of conductors at the edges, one within another.

It will be noted that crossovers within coils are avoided. Clearly this is an important advantage in the manufacture of cursors since it avoids the necessity of locating conductors crossing the area exactly on top of one another.

When this arrangement is used for the cursor 13 of FIG. 1 of the present invention two sets of sensing coils are provided, one for X co-ordinates and one for Y co-ordinates, the conductors of the coils of different sets being at right angles where they traverse the working area.

Since the cursor has to be moved from place to place, it is connected by a flexible lead to the circuits.

The same arrangement of coils may be used in the table 16 and the edge of a working surface of the table is then defined by the line designated 19. Two sets of coils are again required, one for each co-ordinate, the lines 11 and 12 coinciding with the conductors 20 of the coils.

The conductors making up the coils of the cursor are of course must more closely spaced than those of the working surface, and in practice many more sensing coils are used, at least in the cursor, than are shown in the figures.

As can be appreciated from FIG. 1 showing the main regions and sub-regions the conductors 20 in the working surface are spaced by distances which are an integral multiple of the distances between the conductors 20' of the cursor.

If the sensing coils are arranged as shown in FIG. 3 in both the working surface of the table 16 and the cursor 13, the position of a point in the working surface is indicated by means of a stylus 14 which includes an electrical coil 40 with a magnetic member 41 passing through it. When a pulse of current is passed through the coil 40 the flux associated with the magnetic member 41 varies and if the stylus is positioned adjacent to the cursor, currents are induced in the various coils defining the main regions and sub-regions.

Although only a relatively small number of sensing elements in the form of coils are used a direct digital output can be obtained from the coils by way of the simple decoding circuit shown in FIG. 4. The output is in the form of a binary number having the usual arrangement of bits which are more significant towards the left of the number.

In order to simplify FIG. 4 only the coils 17, 21, 22 and 23 are included but it will be realised that in practice depending on the resolution required, the coil 24 and a number of other coils may be required.

In order that the binary numbers relating to each region can be easily seen they are marked above the coils in FIG. 4 between lines representing graduations of the X co-ordinate.

Three subtractor circuits 26, 27 and 28 are connected to the coils 21, 22 and 23 respectively and in addition each subtractor circuit receives half the output signal from the coil 17 derived by way of a potentiometer consisting of two equal resistors 30 and 31. In practice the subtractor circuits may simply be an appropriate arrangement of connections allowing the difference between the voltages in each of the coils 26, 27 and 28 from that in the coil 17 to be obtained. The subtractor circuits 26, 27 and 28 are connected to comparators 32, 33 and 34, respectively, each of which may conveniently comprise a saturable amplifier. The output from the comparator 32 is connected to an output terminal 35 at which the most significant bit appears and the output from this comparator is also connected to an exclusive OR gate 36 which also receives the output from the comparator 33. The output of this OR gate is connected to an output terminal 37 where the second most significant figure appears. A further exclusive OR gate 38 receives the output from the gate 36 and also that from the comparator 34 and its output is connected to an output terminal 39 where the least significant bit appears.

In operation a diagram 15 (FIG. 2) which is to be processed is placed on the surface of the table 16 and the cursor 13 is placed over the area of interest. As mentioned above care must be taken to position the cursor exactly in relation to the lines dividing the regions and the left-hand side of the cursor must be on the left-hand edge of the working surface of the table or an even number of main regions therefrom and the lower edge of the cursor (as seen in FIG. 1) must be on the lower edge of the working surface or an even number of main regions therefrom. For this reason the surface is marked, for example in the way shown, as that the cursor can be placed exactly in position. If apertures are provided at the corners of each main region and corresponding apertures exist in the cursor, the cursor can be pegged into position through the apertures before use.

Taking as an example a point A in FIG. 4 the position of which on the cursor is in operation indicated by the stylus 14, it is seen that flux from the stylus in this position, when a current pulse is passed through the stylus coil, links only the coils 17 and 23. Thus the output from the subtractors 26 and 27 will be half the negative value E of the signal induced in the coil 17 while the output from the subtractor 28 will be E = (E/2) where it is assumed that the voltage induced in each of the coils is the same and equal to E. The application of these voltages to the comparators 32, 33 and 34 produces a binary output in which a negative signal such as (−E/2) is represented by a zero voltage, a positive signal such as (+E/2) is represented by a positive voltage, that is the outputs of the comparators 32, 33 and 34 can be represented by the binary digits, 0, 0 and 1 respectively. Hence it can be seen that the signals appearing at the terminals 35, 37 and 39 represent the same digits, 0, 0, 1 which correspond to the X co-ordinate of the point A as shown at the top of FIG. 4. In a similar way three more digits are generated in logic circuits connected to the coils of the working surface of the table.

In a further example, the point B, is now considered. The coils 17, 21 and 22 loop the point B but the coil 23 does not. Hence the subtractor circuits 26 and 27 each receive the voltage E − (E/2) and the subtractor circuit 28 receives the voltage −(E/2). The comparators 32, 33 and 34 then output signals representing the numbers 1, 1 and 0 respectively, so that the signals appearing at the terminals 35, 37 and 39 are 1, 0 and 0 respectively. These digits again correspond to the binary number for the X co-ordinate of the point B, and again signals representing digits are produced from the coils of the table.

Clearly when the stylus is used to follow a line on a map the co-ordinates of a series of points are generated as further current pulses are applied to the stylus coil.

The coil 17 is not essential but it allows binary ones and zeros to be represented by voltages of opposite polarities.

In most applications two co-ordinate signals will be required and, as is mentioned above, two series of coils are required for the cursor and two more for the table. Each series of coils is connected to its own group of subtractor circuits, comparators and exclusive OR gates arranged as indicated in FIG. 4.

The general rule for determining the coils of FIG. 4, after coils 17 and 21 have been chosen, is to divide each remaining portion between conductors in two using conductors of the next coil and then repeat the procedure for each further coil. However, (unless crossovers are used) no conductor follows the same route as a conductor of a previous coil.

Since in FIG. 1 of the present specification there are eight rows of sub-regions, eight columns of such regions, and the cursor covers four main regions, two "bits" representing position are obtained from the table and three more "bits" from the cursor for each co-ordinate. Of course, if the cursor covered only one main region and was divided, as shown in FIG. 1, into 64 sub-regions, three bits would be obtained from the table and three from the cursor.

In another arrangement the surface of the table 16 does not contain sensing coils, the main regions being defined by the lines 11 and 12. In operation when an operator has placed the cursor in position, he keys the co-ordinate of the bottom left-hand corner of the cursor into receiving equipment for example a read-out circuit 42 (see FIG. 5) by means of a keyboard 43. The operator decides on the co-ordinate and keys the corresponding number into the equipment but since the table surface is divided into eight rows and eight columns of main regions and the cursor covers four main regions, only the first two bits of more significance are keyed in for each co-ordinate. Three less significant bits are obtained from the cursor in the way already described by means of the circuits of FIG. 4 represented by the logic circuit 44 in FIG. 5.

Again, since the cursor 13 as shown covers four main regions, it must always be placed with the left-hand side of the cursor at the left-hand edge of the working surface of the table or an even number of squares from the left-hand edge of the working surface and with the lower edge of the cursor (as seen in FIG. 1) at the lower edge of the working surface or an even number of squares from the lower edge of the working surface. Then the two most significant bits in each co-ordinate are compatible with the three least significant bits obtained from the cursor.

The cursor and in some cases the surface have been described as being wired in a specific way or in one of the ways described in the aforementioned complete specification but other methods of wiring and of dividing an area into regions may, of course, be used. Other types of graphical input tablets, that is devices in which the movement of stylus means in writing, or drawing or following lines already established, for example, is converted into an electrical signal, may also be used as the working surface and/or the cursor means.

I claim:

1. Apparatus for generating signals representative of the position of a point on a surface indicated by stylus means, including:

a member having a working surface suitable for use with stylus means to allow the stylus means to be used to indicate points in the working surface;

first sensing means for sensing the position of an indicating portion of the stylus means in relation to the working surface to sense the position of points therein indicated by the stylus means;

cursor means which may be positioned on the working surface over any point therein without materially affecting the operation of the first sensing means even when between the stylus means and the working surface, the cursor means having a working area which is small in relation to the working surface; and second sensing means for sensing the position of the indicating portion of the stylus means in relation to the working area of the cursor means to sense the position of points therein indicated by the stylus means, the resolution of the second sensing means being high relative to that of the first sensing means.

2. Apparatus according to claim 1 wherein the second sensing means includes first and second groups of parallel conductors traversing the said working area of the cursor with the conductors of the first group at right angles to those of the second group, the conductors of each group being spaced equally apart, and the conductors dividing the working area into sub-regions.

3. Apparatus according to claim 2 wherein the first sensing means includes third and fourth groups of parallel conductors traversing the working surface with the conductors of the first group at right angles to those of the second group, the conductors of the third and fourth groups being spaced apart equally by distances which are an integral multiple of the distances between the conductors of the first and second groups, respectively, and dividing the working surface into main regions.

4. Apparatus according to claim 3 wherein the conductors of the first and second groups form edge portions of a plurality of coils in first and second groups, respectively, of substantially rectangular coils and each sub-region of the said working area is within an arrangement of coils of the first and second groups particular to that sub-region, and the conductors of the third and fourth groups form edge portions of a plurality of coils in third and fourth groups, respectively, of substantially rectangular coils and each main region of the working surface is within an arrangement of coils of the third and fourth groups particular to that main region.

5. Apparatus according to claim 1, including means for allowing the cursor means to be located with respect to predetermined positions on the working surface.

6. Apparatus according to claim 5 wherein the means for allowing the cursor means to be located on the working surface is a rectangular grid of lines on the working surface.

7. Apparatus according to claim 4 including means for allowing the cursor means to be located on the working surface comprising a rectangular grid of lines on the working surface, the lines being coincident with the edges of the main regions.

8. Apparatus according to claim 7 including stylus means having an electrical coil and an elongated member of magnetic material passing through the coil, one end of the elongated member forming the said indicating portion of the stylus means.

9. Apparatus according to claim 8 including means for generating electrical pulses in the coil of the stylus means, and logic circuits for deriving digital signals representative of rectangular co-ordinates in the plane of the working surface of the position of the indicating portion of the stylus means for signals induced in the four groups of coils when pulses are applied to the coil of the stylus means.

10. Apparatus for generating signals representative of the position of a point indicated by stylus means, including:
a member having a working surface divided by first and second groups of equally spaced parallel lines, the lines of the first group being at right angles to those of the second group, and the lines of the groups dividing the working surface into main regions;
cursor means which may be positioned on the working surface over any pont therein, the cursor means having a rectangular working area which is small in relation to the working surface, and which is shaped and dimensioned to either allow the cursor to be positioned on the working surface with the working area coincident with any one main region, or with any group of main regions containing a predetermined integral number of adjacent main regions in a predetermined configuration; and
sensing means for sensing the position of the indicating portion of stylus means in relation to the working area to sense the position of points therein indicated by the stylus means.

11. Apparatus according to claim 10 wherein the sensing means comprises first and second groups of parallel conductors traversing the working area with the conductors of the first group at right angles to those of the second group, the conductors of each group being spaced equally apart, the conductors dividing the working area into sub-regions, and the distances between the lines of the first and second groups of lines being an integral multiple of the distances between the conductors of the first and second groups of conductors, respectively.

12. Apparatus according to claim 11 wherein the conductors of the first and second groups form edge portions of a plurality of coils in first and second groups, respectively, of substantially rectangular coils, and each sub-region is within an arrangement of coils of the first and second groups particular to that sub-region.

13. Apparatus according to claim 12 including stylus means having an electrical coil and an elongated member of magnetic material passing through the coil, one end of the elongated member forming the said indicating portion of the stylus means.

14. Apparatus according to claim 13 including means for generating electrical pulses in the coil of the stylus means, and logic circuits for deriving digital signals representative of rectangular co-ordinates in the plane of the working area of the position of the indicating portion of the stylus means from signals induced in the two groups of coils when pulses are applied to the coil of the stylus means.

15. Apparatus according to claim 10 including position indicating means for providing signals representative of the position of the cursor means on the working surface.

16. Apparatus according to claim 15 wherein the position indicating means in manually operable and provides cursor position signals in response to operations carried out by an operator to indicate the position of the cursor means.

17. A method of obtaining an indication of the position of a point on a working surface, comprising the steps of:
positioning cursor means having a small working area in relation to the working surface, on the working surface with the said point within the said working area;
indicating the position of the said point with an indicating portion of the stylus means;
obtaining first signals representative of the position of said point on the working surface using first sensing means constructed to operate in conjunction with the stylus means to generate the said first signals;
obtaining second signals representative of the position of the said point on the working area of the cursor means using second sensing means constructed to operate in conjunction with the stylus means to generate the said second signals; and
combining the first and second signals to provide an overall indication of the position of the point.

18. A method according to claim 17 wherein the cursor means is positioned on the working surface in that one of a plurality of predetermined positions which together encompass the whole working surface with or without overlap in which the said point is located, and wherein in combining the first and second signals the location of the said one predetermined position is taken into account.

19. A method of obtaining an indication of the position of a point on a working surface divided by first and second groups of equally spaced parallel lines, the lines of the first group being at right angles to those of the second group, and the lines of the groups dividing the working surface into main regions, comprising the steps of:

positioning cursor means having a small working area in relation to the working surface on the working surface with the said point within the said working area, and, with the aid of the lines on the working surface, with the working area coincident with one or more main regions, depending on the size of the working area in relation to the main regions;

indicating the position of the said point with the indicating portion of stylus means, the stylus means being constructed to operate in conjunction with sensing means to sense the position of the indicating portion;

obtaining signals representative of the position of the said point on the working area of the cursor means from the sensing means;

recording the position of the cursor means on the working surface; and combining the recorded position with the signals obtained from the sensing means to provide an overall indication of the position of the point.

20. A method of obtaining an indication of the position of a point on a sheet using a working surface and transparent cursor means having a small working area in relation to the working surface, comprising the steps of: positioning the sheet on the working surface; positioning the cursor means on the sheet with the point within the working area of the cursor means; indicating the position of the said point with the indicating portion of stylus means; obtaining first signals representative of the position of the said point on the working surface using first sensing means constructed to operate in conjunction with the stylus means to generate the said first signals;

obtaining second signals representative of the position of the said point on the working area of the cursor means using second sensing means constructed to operate in conjunction with the stylus means to generate the said signals; and combining the first and second signals to provide an overall indication of the position of the point.

21. A method according to claim 20 wherein the cursor means is positioned on the working surface in that one of a plurality of predetermined positions which together encompass the whole working surface with or without overlap in which the said point is located, and wherein in combining the first and second signals the location of the said one predetermined position is taken into account.

22. A method of obtaining an indication of the position of a point on a sheet using a working surface divided by first and second groups of equally spaced parallel lines, the lines of the first group being at right angles to those of the second group, and the lines of the groups dividing the working surface into main regions and transparent cursor means having a small working area in relation to the working surface, comprising the steps of:

positioning the sheet on the working surface;

positioning the cursor means on the sheet with the said point within the working area of the cursor means, and, with the aid of the lines on the working surface, with the working area coincident with one or more main regions, depending on the size of the working area in relation to the main regions;

indicating the position of the said point with the indicating portion of stylus means, the stylus means being constructed to operate in conjunction with sensing means to sense the position of the indicating portion;

obtaining signals representative of the position of the said point on the working area of the cursor means from the sensing means;

recording the position of the cursor means on the working surface; and combining the recorded position with the signals obtained from the sensing means to provide an overall indication of the position of the point.

* * * * *